United States Patent [19]

Burkhardt

[11] Patent Number: 4,725,643

[45] Date of Patent: Feb. 16, 1988

[54] PROCESS FOR PREPARING LINEAR ORGANOPOLYSILOXANES HAVING TERMINAL TRIORGANOSILOXY GROUPS

[75] Inventor: Jürgen Burkhardt, Winhöring, Fed. Rep. of Germany

[73] Assignee: Wacker-Chemie GmbH, Munich, Fed. Rep. of Germany

[21] Appl. No.: 874,330

[22] Filed: Jun. 16, 1986

[30] Foreign Application Priority Data

Jul. 9, 1985 [DE] Fed. Rep. of Germany ....... 3524484

[51] Int. Cl.$^4$ .............................................. C08K 3/02
[52] U.S. Cl. ..................................... 524/789; 524/493; 524/864; 524/869; 528/21; 528/22; 528/23; 528/33; 556/467
[58] Field of Search ....................... 528/23, 21, 22, 33; 524/864, 869, 493, 789; 556/467

[56] References Cited

U.S. PATENT DOCUMENTS 4,008,198  2/1977  Krohberger et al. ................. 528/10
4,203,913  5/1980  Burkhardt et al. ................... 528/10

Primary Examiner—Melvyn I. Marquis

[57] ABSTRACT

Linear triorganosiloxy-terminated organopolysiloxanes are prepared by the condensation of linear organopolysiloxanes having one Si-bonded hydroxyl group in each teminal unit in the presence of phosphonitrilic chloride, and after the organopolysiloxane has reached the desired average viscosity and while still containing the phosphonitrilic chloride, the organopolysiloxane is reacted with from 0.05 to 1 weight percent of hexaorganodisilazane, based on the weight of the starting organopolysiloxane, with the proviso that a filler having a BET surface area of at least 50 m$^2$/g does not exceed 1 weight percent, based on the weight of the starting organopolysiloxane.

2 Claims, No Drawings

PROCESS FOR PREPARING LINEAR ORGANOPOLYSILOXANES HAVING TERMINAL TRIORGANOSILOXY GROUPS

The present invention relates to a process for preparing linear organopolysiloxanes and more particularly to a process for preparing linear organopolysiloxanes having terminal triorganosiloxy units.

BACKGROUND OF INVENTION

The preparation of triorganosiloxy-terminated linear organopolysiloxanes from linear organopolysiloxanes having one Si-bonded hydroxyl group in each terminal unit and silicon compounds containing two triorganosilyl groups in each molecule using phosphonitrilic chloride as a catalyst has been described, for example, in U.S. Pat. No. 4,203,913 to Burkhardt et al.

Transparent elastomers have been described in U.S. Pat. No. 4,008,198 to Krohberger et al, in which highly viscous diorganopolysiloxanes are mixed with a nitrogen containing compound having at least one triorganosilyl group and at least one nitrogen atom linked either directly to a silicon atom or via an oxygen atom, from 4 to 40 percent by weight of hexaorganodisilazane, based on the weight of the viscous diorganopolysiloxanes and from 10 to 150 percent of a silicon dioxide filler having a surface area of at least 50 m²/g, based on the weight of the viscous diorganopolysiloxanes.

In contrast to the teachings of the Krohberger et al. reference, applicant has found that linear organopolysiloxanes having terminal triorganosiloxy units which are prepared from hydroxy terminated organopolysiloxanes, have high thermal stability, low electrical conductivity, and will not discolor during storage or corrode metal surfaces when a small amount of hexaorganodisilazane is added to the triorganosiloxy terminated organopolysiloxanes in the absence of essential amounts of a filler having a BET surface area of at least 50 m²/g It is, therefore, an object of the present invention to provide a process for preparing triorganosiloxy-terminated linear organopolysiloxanes from linear organopolysiloxanes having one Si-bonded hydroxyl group in each terminal unit and organosilicon compounds having two triorganosilyl groups per molecule, using less phosphonitrilic chloride as the catalyst than was used heretofore to prepare linear organopolysiloxanes having terminal triorganosiloxy units. Another object of the present invention is to prepare triorganosiloxy terminated linear organopolysiloxanes having the same quality, while using less phosphonitrilic chloride catalyst and employing the same residence time for the reactants in the reactor. Still another object of the present invention is to provide a process for preparing linear organopolysiloxanes having terminal triorganosiloxy units which does not require additives in order to deactivate the phosphonitrilic chloride or reaction products thereof, which promote the condensation and/or equilibration of organopolysiloxanes. Still another object of the present invention is to provide a process for preparing triorganosiloxyterminated linear organopolysiloxanes from linear organopolysiloxanes having one Si-bonded hydroxyl group in each terminal unit and organosilicon compounds having two triorganosilyl groups per molecule, using phosphonitrilic chloride as the catalyst, which will give particularly high space-time yields and provide, in particular, mostly physiologically safe linear organopolysiloxanes having an especially small number of Si-bonded hydroxyl groups. A further object of the present invention is to provide a process for preparing triorganosiloxy terminated linear organopolysiloxanes having a high thermal stability and having a particularly low electrical conductivity. A still further object of the present invention is to provide a process for preparing triorganosiloxy terminated linear organopolysiloxanes which will not become cloudy or discolor during storage, and will not corrode metal surfaces.

SUMMARY OF THE INVENTION

The foregoing objects and others which will become apparent from the following description are accomplished, in accordance with this invention, generally speaking, by providing an improved process for preparing triorganosiloxy-terminated linear organopolysiloxanes by the condensation and/or equilibration of linear organopolysiloxanes having one Si-bonded hydroxyl group in each terminal unit and organosilicon compounds having two triorganosilyl groups per molecule in the presence of a phosphonitrilic chloride catalyst, the improvement which comprises reacting the linear organopolysiloxanes having one Si-bonded hydroxyl group in each terminal unit and the phosphonitrilic chloride, which is present in an amount of from 1 to 40 ppm by weight based on the weight of the starting organopolysiloxane with hexaorganodisilazane after the organopolysiloxane has reached the desired average viscosity, in which the hexaorganodisilazane is present in an amount of from 0.05 to 1 weight percent based on the weight of the starting organopolysiloxane, with the proviso that a filler having a BET surface area of at least 50 m²/g does not exceed 1 weight percent, based on the weight of the starting organopolysiloxane.

DESCRIPTION OF THE INVENTION

Any linear organopolysiloxane having one Si-bonded hydroxyl group in each terminal unit, which has been or could have been used heretofore in the presence of phosphonitrilic chloride as a catalyst to increase the viscosity of the organopolysiloxane by the condensation reaction may be used in the process of the present invention. Examples of preferred organopolysiloxanes are those having the formula $$HO(SiR_2O)_mH,$$

where R represents the same or different monovalent hydrocarbon group or halogenated monovalent hydrocarbon group, or hydrogen, with the proviso that one hydrocarbon group is bonded to each silicon to which hydrogen is directly bonded and m is an integer having a value of at least 2. The value of m is preferably such that the average viscosity of the organopolysiloxane does not exceed about 500 mm²·s⁻¹ at 25° C. before it is mixed with the phosphonitrilic chloride.

Although this is generally not shown in the formula, up to a total of about 5 mol percent of units having the formula $SiR_2O$ may be replaced by other siloxane units, such as siloxane units having the formulas $RSiO_{3/2}$ and $R_3SiO_{\frac{1}{2}}$, where R is the same as above, or $SiO_{4/2}$ or mixtures of at least two such units. The siloxane units other than the $SiR_2O$ units are generally present as impurities.

The R groups shown in the above formula preferably contain from 1 to about 18 carbon atoms per group.

Examples of hydrocarbon groups represented by R are alkyl groups such as methyl, ethyl, n-propyl, isopropyl, n-butyl and sec-butyl as well as octadecyl; aliphatic groups having carbon-carbon double bonds such as vinyl and allyl; aryl groups such as phenyl and xenyl; alkaryl groups such as tolyl; and aralkyl groups such as benzyl.

Examples of halogenated hydrocarbon groups represented by R are haloalkyl moieties, such as 3,3,3-trifluoropropyl, and haloaryl moieties such as the o-, p- and m-chlorophenyls.

The process of this invention preferably employs diorganopolysiloxanes having one Si-bonded hydroxyl group in each terminal group and all the organic groups are methyl radicals.

The preferred average viscosity attained by the organopolysiloxane having one Si-bonded hydroxyl group in each terminal unit before said organopolysiloxane is reacted with hexaorganodisilazane is preferably $1 \times 10^3$ to $5 \times 10^7$ mPa.s at 25° C.

After the organopolysiloxane achieves the desired viscosity in the presence of the phosphonitrilic chloride catalyst, the organopolysiloxane containing the phosphonitrilic chloride is reacted with a hexaorganodisilazane. The phosphonitrilic chloride used in the condensation/equilibration reaction may be the same phosphonitrilic chloride used heretofore to promote the condensation of a linear organopolysiloxane having one Si-bonded hydroxyl group in each terminal unit. For example, the phosphonitrilic chlorides include those obtained by reacting 400 weight parts of phosphorus pentachloride with 130 parts of ammonium chloride, such as described in *Berichte der Duetschen Chemischen Gesellschaft*, volume 57 (1924), page 1345, or those obtained by reacting 2 moles of phosphorus pentachloride with 1 mole of ammonium chloride, such as described in U.S. Pat. No. 3,839,388 to Nitzsche et al. Of course, mixtures of at least two types of phosphonitrilic chlorides may also be used.

The phosphonitrilic chloride is preferably used in an amount of from about 1 to 40 ppm by weight and more preferably from about 5 to 20 ppm by weight, based on the weight of the starting linear organopolysiloxane having one Si-bonded hydroxyl group in each terminal unit.

The condensation of the linear organopolysiloxane having one Si-bonded hydroxyl group in each terminal unit is preferably conducted at a temperature of from about 100° to 200° C.

In order to facilitate the removal of water formed in the condensation reaction, it is preferred that the condensation of the linear organopolysiloxane having one Si-bonded hydroxyl group in each terminal unit be conducted at pressures below about 800 hPa (absolute); however, the condensation may also be conducted at higher pressures, if desired.

The time interval between addition of phosphonitrilic chloride to the linear organopolysiloxane having one Si-bonded hydroxyl group in each terminal unit and the addition of the hexaorganodisilazane is preferably from 2 to 20 minutes and more preferably from 5 to 10 minutes.

Hexaorganodisilazanes used in the process of this invention preferably have the formula

[R$^1$$_3$Si]$_2$NH, where R$^1$ is the same or different monovalent hydrocarbon group or a halogenated monovalent hydrocarbon group. Preferably, the R$^1$ groups contain from 1 to 18 carbon atoms per group. Specific examples of organic groups represented by R above are also applicable for the R$^1$ groups.

A specific example of a preferred hexaorganodisilazane is 1,3-divinyl-1,1,3,3-tetramethyldisilazane. Another hexaorganodisilazane which may be used in the process of this invention is hexamethyldisilazane.

The hexaorganodisilazane is preferably used in an amount of from about 0.1 to about 0.5 weight percent based on the weight of the starting diorganopolysiloxane.

The reaction of the hexaorganodisilazane with the linear organopolysiloxane having one Si-bonded hydroxyl group in each terminal unit takes place upon, or soon after these two reactants are mixed. The organopolysiloxane may be at the temperature, or approximately at the temperature, at which the desired viscosity was attained. The ammonia formed in the reaction of the Si-bonded hydroxyl groups with the hexaorganodisilazane deactivates the catalyst.

The process of the present invention may be conducted batch-wise or semi-continuously, or as a continuous process; however, it is preferably conducted as a continuous process.

It is preferred that the hexaorganodisilazane be added to the linear organopolysiloxane having one Si-bonded hydroxyl group in each terminal unit after it has reached the desired average viscosity and after it has been removed from the vessel in which condensation of the Si-bonded hydroxyl groups was conducted.

The linear triorganosiloxy-terminated organopolysiloxanes prepared in accordance with the present invention are applicable for all purposes known heretofore for linear triorganosiloxy-terminated organopolysiloxanes produced by previous methods. These linear triorganosiloxy-terminated organopolysiloxanes may be used, for example, as thread lubricants, in the formation of organopolysiloxane elastomers which are crosslinked by radical-forming agents, or by the addition of SiC-bonded vinyl groups to Si-bonded hydrogen, and in the formation of nonstick coatings.

The phosphonitrilic chloride used in the following examples is prepared in the following manner:

A mixture containing 417 g (2 moles) of phosphorus pentachloride, 53.5 g (1 mole) of ammonium chloride and 1000 ml of tetrachloroethane is boiled under reflux for 12 hours. The volatiles are removed from the resultant light yellow solution at 160° at approximately 1.33 hPa (abs.), leaving a residue of yellow crystals which consist essentially of a compound having the formula

Cl$_3$PNPCl$_2$NPCl$_3$.PCl$_6$.

EXAMPLE 1

(a) About 300 liters/hr of a dimethylpolysiloxane having one Si-bonded hydroxyl group in each terminal unit (viscosity at 25° C., 140 mm$^2$−sec$^{-1}$) is continuously fed into a twin-screw kneader having a reaction zone of about 140 cm in length, which is maintained at 150° C. and at 6.7 hPa (ab.s), together with 5 ppm by weight (based on the weight of the dimethylpolysiloxane) per hour of the phosphonitrilic chloride as an 0.5 weight percent solution in methylene chloride.

(b) The resultant organopolysiloxane, while still at approximately 150° C., is mixed with 0.2 weight percent (based on the weight of the dimethylpolysiloxane) of 1,3-divinyl-1,1,3,3-tetramethyldisilazane per hour in the discharge tube using a gear pump. After 24 hours, the resultant vinyldimethylsiloxyterminated dimethylpolysiloxane has a torque value of 4500 Nm, as determined on a Brabender Plastograph at 25° C. and at 60 rpm. The absence of Si-bonded hydroxyl groups is determined by mixing a sample of the vinyldimethylsiloxy-terminated dimethylpolysiloxane with 1 weight percent (based on the weight of the sample) of a mixture containing equal parts by weight of tetra(methoxyethyleneoxy) silicate and di-n-butyltin dilaurate and allowing the resultant mixture to stand overnight at room temperature. Since the mixture did not form an elastomer, this indicates that the dimethylpolysiloxane is free of Si-bonded hydroxyl groups.

EXAMPLE 2

The procedure described in Example 1 is repeated, except that 7 ppm by weight (based on the weight of the dimethylpolysiloxane) of phosphonitrilic chloride as an 0.5 weight percent solution in methylene chloride is used per hour instead of the 5 ppm by weight of phosphonitrilic chloride.

The resultant vinyldimethylsiloxy-terminated dimethylpolysiloxane has a torque value of 6500 Nm as determined in a Brabender Plastograph at 25° C and at 60 rpm. The dimethylpolysiloxane is free of Si-bonded hydroxyl groups as determined by the test described in Example 1(b).

COMPARISON EXAMPLE $V_1$ (a) The procedure described in Example 1(a) is repeated, except that only 200 liters/hr of dimethylpolysiloxane having one Si-bonded hydroxyl group in each terminal units is used instead of 300 liters/hr, and 25 ppm by weight based on the weight of the dimethylpolysiloxane having Si-bonded hydroxyl groups of phosphonitrilic chloride is used per hour as an 0.5 percent methylene chloride solution instead of the 5 ppm phosphonitrilic chloride. In addition, 3 liters/hr of vinyldimethylsiloxy-terminated dimethylpolysiloxane having a viscosity of 135 mm$_2$—sec$^{-1}$ at 25° C. is fed into the kneader.

(b) The resultant organopolysiloxane, while still at approximately 150° C., is mixed with 150 ppm by weight (based on the weight of this organopolysiloxane) of tert-octylamine per hour using a gear pump.

The resultant dimethylpolysiloxane, which has a torque value of 4800 Nm as determined in a Brabender Plastograph at 25° C and at 60 rpm, forms an elastomer when tested in accordance with the procedure described in Example 1(b). This indicates that not all the Si-bonded hydroxyl groups in the resultant dimethylpolysiloxane have been replaced by vinyldimethylsiloxy groups.

COMPARISON EXAMPLE $V_2$

The procedure described in Comparison Example $V_1$ is repeated, except that only 2 liters/hr of vinyldimethylsiloxyterminated dimethylpolysiloxane is used instead of 3 liters/hr of this polysiloxane.

The resultant dimethylpolysiloxane has a torque value of 6200 Nm as determined in a Brabender Plastograph at 25° C and 60 rpm. When the resultant dimethylpolysiloxane is tested in accordance with the procedure described in Example 1(b), an elastomer is formed. This indicates that not all of the Sibonded hydroxyl groups in the resultant dimethylpolysiloxane have been replaced by vinyldimethylsiloxy groups.

What is claimed is:

1. A process for preparing linear triorganosiloxy-terminated organopolysiloxanes which consists essentially of (1) reacting linear organopolysiloxanes having one Si-bonded hydroxyl group in each terminal unit in the presence of from 1 to 40 ppm by weight of phosphonitrilic chlorides based on the weight of the starting linear organopolysiloxanes having one Si-bonded hydroxyl group in each terminal unit to form organopolysiloxanes having an average viscosity of from $1 \times 10^3$ to $5 \times 10^7$ mPa.s at 25° C. and thereafter (2) reacting the product obtained from the reaction of the phosphonitrilic chlorides and the organopolysiloxanes having one Si-bodned hydroxyl group in each terminal unit with from 0.05 to 1 weight percent of hexaorganodisilazane based on the weight of the starting organopolysiloxanes, in which a filler having a BET surface area of at least 50 m$^2$/g, does not exceed 1 weight percent, based on the weight of the starting organopolysiloxanes.

2. The improved process of claim 1, wherein the hexaorganodisilazane is 1,3-divinyl-1,1,3,3-tetramethyldisilazane.

* * * * *